(12) United States Patent
Lvovskiy et al.

(10) Patent No.: US 8,305,295 B2
(45) Date of Patent: Nov. 6, 2012

(54) OPTOELECTRONIC DISPLAY SYSTEM FOR TRANSPORT VEHICLES

(76) Inventors: Matvey Lvovskiy, Brooklyn, NY (US);
Alexander Efros, Saint Petersburg (RU);
Mikhail Lvovsky, Brooklyn, NY (US)

( * ) Notice: Subject to any disclaimer, the term of this patent is extended or adjusted under 35 U.S.C. 154(b) by 213 days.

(21) Appl. No.: 12/592,296

(22) Filed: Nov. 23, 2009

(65) Prior Publication Data
US 2011/0122049 A1    May 26, 2011

(51) Int. Cl.
G09G 5/00 (2006.01)
G02B 27/14 (2006.01)
(52) U.S. Cl. .................. 345/1.3; 345/1.1; 345/7; 345/9; 359/629; 359/630
(58) Field of Classification Search ............ 345/1.1–1.3, 345/2.1–2.3, 3.1, 7–9; 359/618–641
See application file for complete search history.

(56) References Cited

U.S. PATENT DOCUMENTS

| | | | |
|---|---|---|---|
| 4,925,272 A | 5/1990 | Ohshima et al. | |
| 4,987,410 A * | 1/1991 | Berman et al. ............... | 345/9 |
| 5,140,465 A | 8/1992 | Yasui et al. | |
| 5,327,154 A | 7/1994 | Aoki | |
| 5,418,651 A | 5/1995 | Lino et al. | |
| 5,497,271 A * | 3/1996 | Mulvanny et al. ............. | 359/631 |
| 5,506,595 A | 4/1996 | Fukano et al. | |
| 5,867,133 A | 2/1999 | Toffolo et al. | |
| 6,262,848 B1 | 7/2001 | Anderson et al. | |
| 6,443,573 B2 | 9/2002 | Aoki | |
| 6,486,856 B1 | 11/2002 | Zink | |
| 6,791,511 B2 | 9/2004 | Eschler et al. | |
| 6,803,860 B1 * | 10/2004 | Langner et al. .............. | 340/971 |
| 6,992,578 B2 | 1/2006 | Aoki et al. | |
| 7,347,551 B2 | 3/2008 | Fergason et al. | |
| 2002/0114044 A1 * | 8/2002 | Chiou et al. ................. | 359/172 |
| 2008/0238814 A1 | 10/2008 | Ishikawa et al. | |
| 2009/0034087 A1 | 2/2009 | Hung et al. | |
| 2009/0115586 A1 | 5/2009 | Lvovskiy et al. | |
| 2009/0160736 A1 | 6/2009 | Shikita | |
| 2009/0201225 A1 | 8/2009 | Okada et al. | |

* cited by examiner

Primary Examiner — Sumati Lefkowitz
Assistant Examiner — Jonathan Horner

(57) ABSTRACT

Optoelectronic Display System for Transport Vehicles is suggested providing simultaneous representation of visual information of different form and content relating to parameters of driving on windscreen and at dashboard plane. To form said visual information unified image creator based on two LCD matrixes is used and image intended for representation on windscreen in collimated form is created on their upper parts and on lower parts—for representation at dashboard plane. To improve operate reliability the system is provided with control device of image creator operation. In case one of LCDs is out-of-service the device is switching other (operable) LCD into mode of parameters 'minimum number creation required for safe driving.

3 Claims, 7 Drawing Sheets

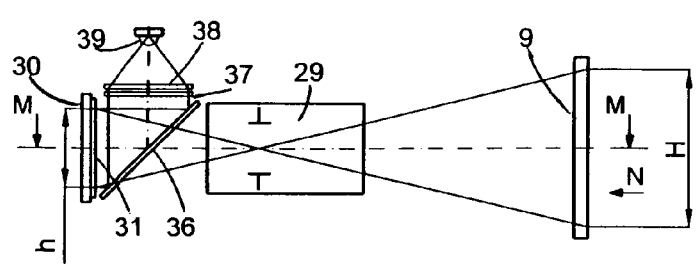
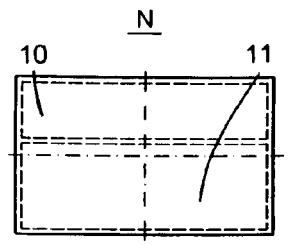
FIG.4B  FIG.4D
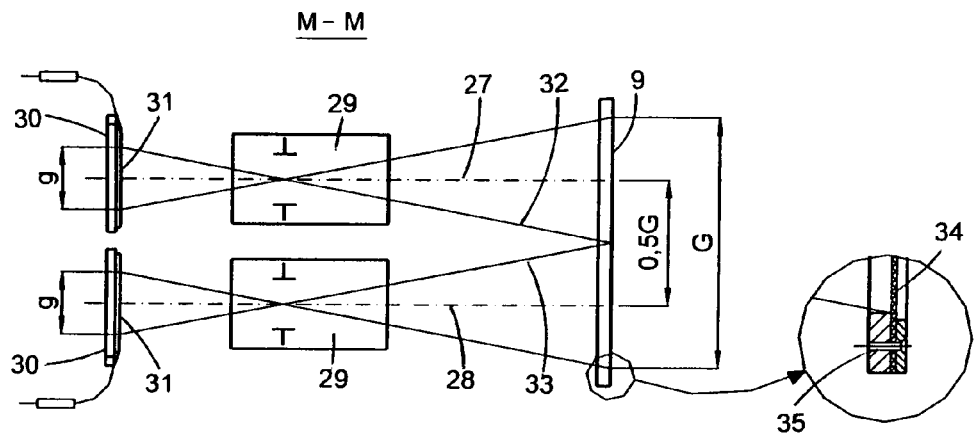
FIG.4A  FIG.4C
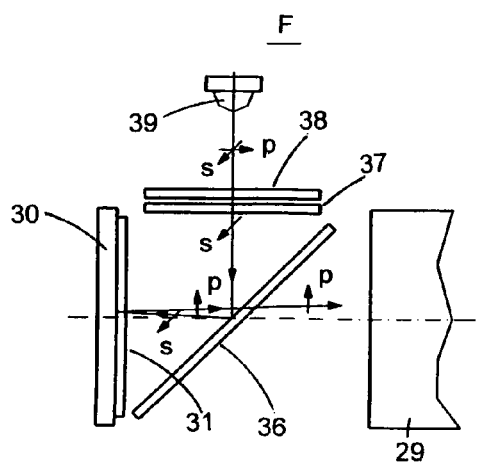
FIG.4E

OPTOELECTRONIC DISPLAY SYSTEM FOR TRANSPORT VEHICLES

BACKGROUND OF THE INVENTION

The proposed optoelectronic display system for automobile and other vehicles (hereinafter referred to as Display System) is intended for indication of car and other vehicles movement data, e.g., speed and traversed path, propulsion system parameters such as: revs, oil pressure, petrol consumption, geographical location of the object and warning, supplemental and other information in real-time mode. The Display System is intended for application in motor vehicles of different types and other multipurpose vehicles.

According to its intended purpose Display System provides:

a. Generating of virtual color image of pointer-type instruments, symbolic images of certain reference and warning signals and parameters of location on a map in accordance with GPS navigation data.

b. Representation of projected into "optical infinity" (collimated) informative picture image containing automobile movement parameters and reference and warning signals at automobile windscreen. Development of proposed Display System gains currency as the need arises to improve the safety of high-speed driving under heavy traffic conditions, to relax psycho physiological stress and to improve system maintainability also.

Currently some luxury cars' models such as Cadillac and BMW are provided with devices of three types:

pointer-type devices installed on the instrument panel opposite the steering wheel;

GPS navigation cart graphical display installed on the torpedo along the car symmetry axes;

display representing collimated image of certain parameters on automobile windscreen.

The referred above instrument system have several operational drawbacks:

Devices are based on different engineering philosophy and functioning independently with their schemes not interconnected that makes it difficult to duplicate the displayed data in case one of them fails to operate.

To view the data on map display screen the head movement is required. While utilizing display the driver is able to view "out-the-window" scene only by peripheral (indirect) vision and consequently the driving safety is decreased especially under the extremal conditions. Therefore it is dangerous to utilize the map display in the automobile.

Quality of the image the driver reads off from the pointer-type devices is considerably dependent on the ambient light conditions inside the automobile. There are the most hard conditions for data readability in the cabriolet models which are rather popular. The above mentioned devices could be affected by direct illumination in these cars that makes it difficult to read off the information. The application of glare shield for the map display is not much efficient at the same time not only the head movement is required for the driver to view the display screen but it is also necessary to take a turn towards the device.

Some time is required for re-accommodation while the driver turns his eyes from the "out-the-window" scene to the devices installed on the instrument panel and to the map display also. The delay for the data reading off is occur caused by eyes' re-accommodation need in case the difference is considerable between the ambient light and illumination inside the automobile. Both factors immediately influence the driver's condition and responsiveness and consequently affect the driving safety especially in case of high-speed driving.

As conducted patent study showed the most similar to the proposed Display system in accordance with their structural scheme are following displays for automobiles described in U.S. Pat. No. 5,497,271, U.S. Pat. No. 6,443,573 patents and multifunction collimating display by US 2009/0115586A1 application for patent.

The Display by U.S. Pat. No. 5,497,271 patent contains video image creator replacing traditional instrument panel and projecting system equipped with semitransparent mirror and the lens which is intended for video image representation on the windscreen. Depending on situation the driver is able to view either initial video image directly on the image creator via semitransparent mirror or its optical image overlaid on the "out-the-window" scene using the reflection from the automobile windscreen. Present display suffers from two fundamental shortcomings:

Due to fixed position of semitransparent mirror the informative picture seen on the automobile windscreen is identical to the informative picture seen directly on the image creator screen via semitransparent mirror. Therefore present display has significant limitations of information content and form caused by methods of graphic information representation on the windscreen. For instance it's impossible to represent virtual images of pointer-type devices or GPS navigation traveling map because the disturbance emerge which obstruct viewing of "out-the-window" flow of traffic that could lead to the accident.

Availability of semitransparent mirror that makes it possible to view the image on the windscreen and directly on the image creator screen decreases brightness of both images that does not pay because it's necessary to get maximum image contrast while viewing it on the windscreen under high ambient light brightness conditions.

Display by U.S. Pat. No. 6,443,573 patent containing two image forming canals: lower (direct vision) and upper ("head-up") each equipped with its own visualizer. The informative picture viewed by the driver in lower canal is not collimated and formed by single visualizer as a result of reflection from flat mirror. The upper canal contains rotatable semitransparent flat mirror which is two position and reflective flat mirror with glued Frenel lens by means of which in driver's field of view 1 informative picture is formed from the second visualizer either at short distance (only by reflection from semi-transparent flat mirror) or at long distance by use of collimating Frenel lens. The driver selects the mode of informative picture representation in upper canal by switching of rotatable two position semi-transparent flat mirror. The display by U.S. Pat. No. 6,443,573 patent also has significant shortcomings the main of which are following:

Being equipped with two visualizers and several complicated optical components the display becomes unjustified more complex while it does not get any additional functions The information image is collimated only in upper canal i.e. "head-up" variant and for only one position of rotatable semitransparent mirror whereas for the second position of mentioned mirror the information is represented at short distance without collimation.

Availability of semi-transparent mirror in optical system of upper canal causes image brightness decrease which is not less than twice for not collimated image and not less than quadruple for collimated image.

Multifunctional collimating display by US 2009/0115586A1 application for patent is installed inside the automobile at the same place which is usually occupied by traditional instrument panel. The Display is made in mono block form and provided with based on LCD matrix single visualizer containing two image forming canals (upper and lower) each equipped with collimating optical system.

The information which is represented at lower canal according with driver's choice is following:

Virtual image of pointer-type devices scales and other informational signs.

Image of GPS navigation map.

To drive with safety while observing the highway the collimated images of several parameters and warning signals are required which are represented at upper canal, i.e. at a car windscreen, overlaid with "out-the-window" scene.

To switch canals the Display is provided with lightproof shutter operated by servo with one side of shutter which is made as a flat reflective mirror turned towards unified image creator which is based on LCD matrix.

To view the image at lower canal (direct vision) the shutter is removed from optical system of lower canal. To view the image from upper canal ("head-up" variant) the shutter is positioned at predetermined angle relatively to the components of upper canal optical system thus blocking the lower canal optical system.

The Display under consideration has a number of significant advantages over the previous ones such as:

At both canals almost 100% of luminous flux emitted by visualizer is effectively used thereby providing high brightness and contrast for the image.

Since both images are collimated time is saved of driver's ocular re-adaptation and re-accommodation while turning eyes to lower canal from upper canal, i.e., from "out-the-window" scene and backwards and thus the fatigability is reduced and accordingly safe drive is possible.

At the same time Display has certain disadvantages such as:

Proposed method of consecutive order for images representation excludes the possibility of simultaneous representation of different images at both canals.

Availability of rotatable mirror provided with electrical servo could cause the Display failure under long-term operation.

Since single visualizer is used for both canals the driver could be deprived from the urgent information if the visualizer is out-of-service.

Proposed Display System makes it possible to eliminate or minimize the aforementioned disadvantages affecting the automobile and other vehicles drive comfort and safety.

Display System is Providing:

a. Simultaneous representation and possibility of viewing:

at place usually occupied by conventional instrument panel high quality color image of pointer-type scaled devices and other informational signs or GPS navigation map data, at the windscreen images of certain car movement parameters, warning signals and other mnemonic signals.

b. Possibility for representation of devices displayed at instrument panel with any type of design by use of software.

c. Possibility of choice for the method (both projection and collimation) of visual information representation at lower canal.

d. High serviceability which is incomparable with known analogs.

SUMMARY OF THE INVENTION

Display System is proposed for automobiles and other vehicles application consisting of computer connected to sensors of all automobile parameters to be represented and display unit mounted at a place usually occupied by instrument panel containing optoelectronic image creator by use of which the initial image is formed and two output canals (upper and lower) for visual information to be displayed with:

a. lower canal representing according with driver's choice:

virtual image of conventional pointer-type scaled devices and various symbols, image of GPS navigation map, b. upper canal representing at the windscreen current parameters of automobile movement and warning and guidelines signals by means of projection to optical "infinity".

The system image creator is carried out on the base of LCD matrix with the long side of matrix positioned vertically and the image to be represented at lower canal is formed at the major segment of matrix square and the image to be represented at upper canal, i.e. on the windscreen, is formed at the minor segment of matrix square.

In order to provide the image of high quality and resolution for both canals the image creator is equipped with two visualizers based on LCD matrixes and single optical combining component (hereinafter referred to as optical integrator) for intermediate images which is carried out as transmissive-diffusive screen with one visualizer forming the left parts of the images and the other visualizer forming the right parts of the images seen by the driver at each canal. Optical super positioning of magnified intermediate images with minimum overlap is carried out by use of two projection objectives at optical integrator which is divided into two unequal parts:

images from corresponding major segments of LCD matrixes intended for representation at lower canal are projected onto lower part of optical integrator which is major;

images from corresponding minor segments of LCD matrixes intended for representing at upper canal are projected onto upper part of optical integrator which is minor.

At the same time by use of complementary projective objective the lower part of optical integrator is optically conjugated with output transparent-diffusive screen of lower canal that is located at instrument panel plane and the upper part of optical integrator is coincided with focal plane of collimating optical system of upper canal.

In addition to above-stated variant of lower canal realization by use of optical projection the other variant is suggested in which the collimated image is displayed both at lower and upper canals. In this case lower canal is equipped with collimating optical system focal plane of which is coincided with lower part of optical integrator. This variant has advantages as required time is decreased for re-accommodation and re-adaptation of driver's vision while turning eyes from "out-the-window" scene and upper canal to lower canal. In addition since it's possible for light beams from outer source to get the intermediate screen only via outlet objective and within its angular field of view the ambient light effect is minimized for quality of the image seen by the driver at lower canal. Present variant can be attracted for consumers and, especially, funs of cabriolets for which sun protection is not provided.

In order to improve system reliability of operation and provide continued representation of real-time information for the driver on the way the Display system is equipped with two visualizers each of them forming one-half fractions of the images at both canals and supplemented with control device for each visualizer's operation monitoring. If one of them is out-of-service special software is being activated by control device that provides representation of minimum data required to continue safe driving at the corresponding one-half fractions of information fields of upper and lower canals by use of other visualizer which is operable.

BRIEF DESCRIPTION OF THE DRAWING

In order to completely appreciate the subject matter of present application for patent and its various advantages following drawings are enclosed with numbering similar to detailed description numbering.

DETAILED DESCRIPTION OF THE PREFERRED EMBODIMENT OF THE INVENTION

Figure 1:
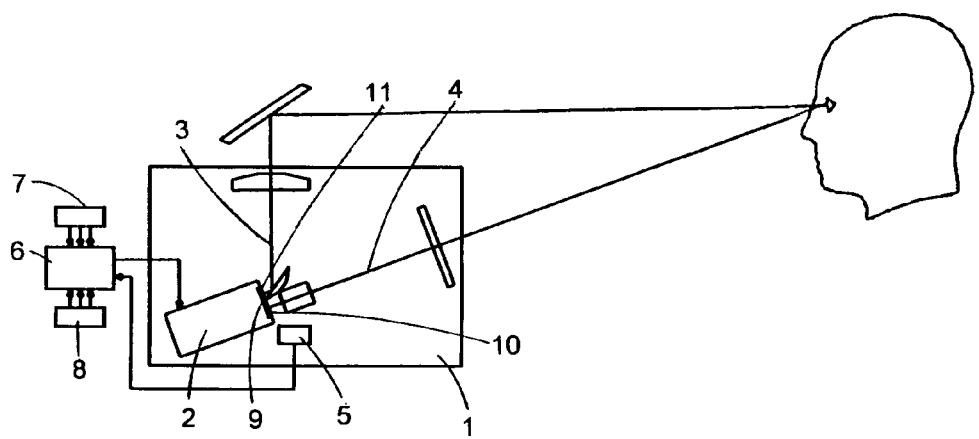
FIG. 1—block—diagram of proposed Display System.

Block-diagram of proposed Display system see at FIG. 1. It contains display unit 1, equipped with image creator 2, optical components of two information canals—upper 3 and lower 4 and device 5 for control of image creator operation. The System also contains computer 6 and control panel 7 that could be placed inside the display unit or outside it as separate modules. Certain computer 6 inputs are connected with automobile sensors 8 of parameters to be represented the other computer inputs are connected with control panel 7 and control device 5. The computer output is connected with image creator 2.

Image creator 2 is provided with optical integrator 9 which is transparent-reflective screen at upper segment 10 of which the intermediate image for upper canal is formed and at its lower segment 11 the intermediate image for lower canal is formed.

Figure 2:
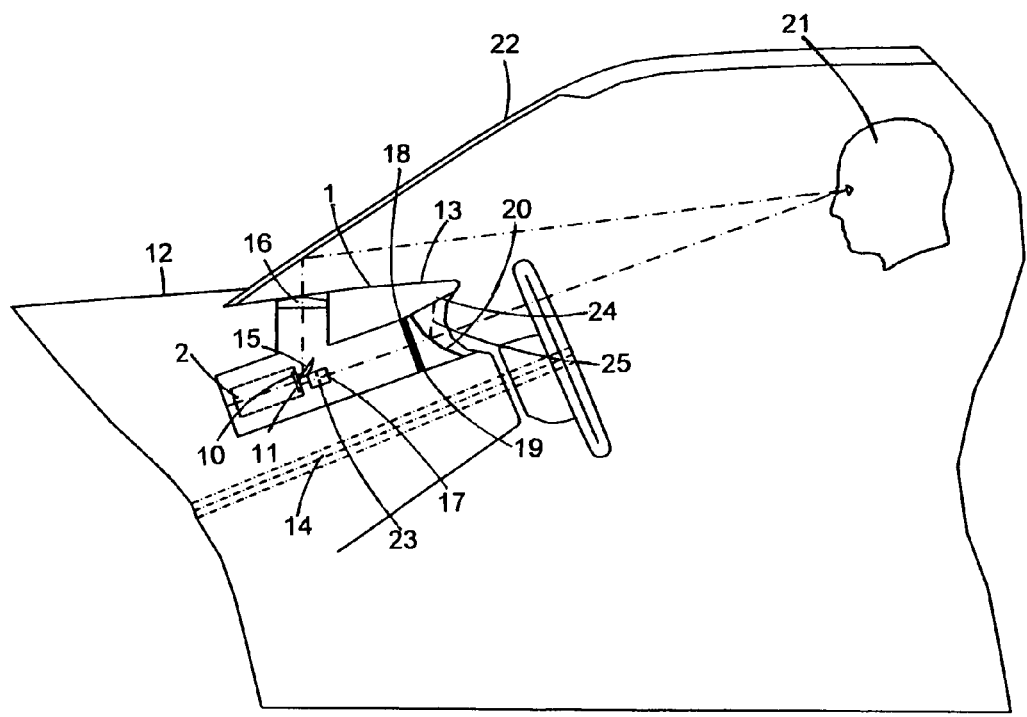
FIG. 2—Display unit with lower canal of projecting type
FIG. 3—Display unit with lower canal of collimating type
FIGS. 4 (A, B, C, D, E)—Image creator based on two LCD matrixes
FIGS. 5 (A, B)—Control device for monitoring of Display unit image creator operation
FIG. 6-11—Types of information fields for Display System upper and lower canals under various operating modes.

Scheme of display unit 1 placed inside the automobile 12 at instrument panel 13 directly above the steering column 14 is indicated at FIG. 2. The display unit contains two information canals—lower canal of direct vision (projective type) and upper—"head-up" canal (collimating type).

"Head-up" canal contains the upper segment 10 of image creator 2 optical integrator 9, mirror 15 for optical axes direction change and objective 16. Canal of direct vision contains lower segment 11 of image creator 2 optical integrator 9, projective objective 17, output transparent—reflective screen 18 with glued Frenel lens 19 and antiglare screen 20. The focal plane of upper canal objective 16 is superposed with upper segment 10 of optical integrator 9 and therefore upper canal provides collimating (projecting to optical "infinity") of informative picture intermediate image 10 that is viewed by driver 21 due to reflection from automobile windscreen 22.

The projective objective 17 of lower canal provides the intermediate magnified image 11 of informative picture at the lower canal screen 18 viewed by the driver 21 due to reflection from the screen 18. Optical conjugation of exit pupil 23 of projective objective 17 with eyes' pupils of driver 21 is carried out by Frenel lens 19 thus providing brightness uniformity for the informative picture displayed at lower canal.

Antiglare screen 20 is carried out of dimming acrylic plastic with luminous transmittance 0.15-0.20. Due to its cylindricity the screen provides the driver's eyes protection against the reflected patches of sunlight since it reflects only lower surface 24 of instrument panel 13 glare shield according with ray path 25. Since the antiglare screen is made of acrylic plastic with luminous transmittance t the image brightness is decreased by 1/t and background ambient light brightness is decreased by $1/t^2$ i.e. the contrast is increased approximately by 1/t, i.e., fivefold under high ambient light conditions.

Figure 3:
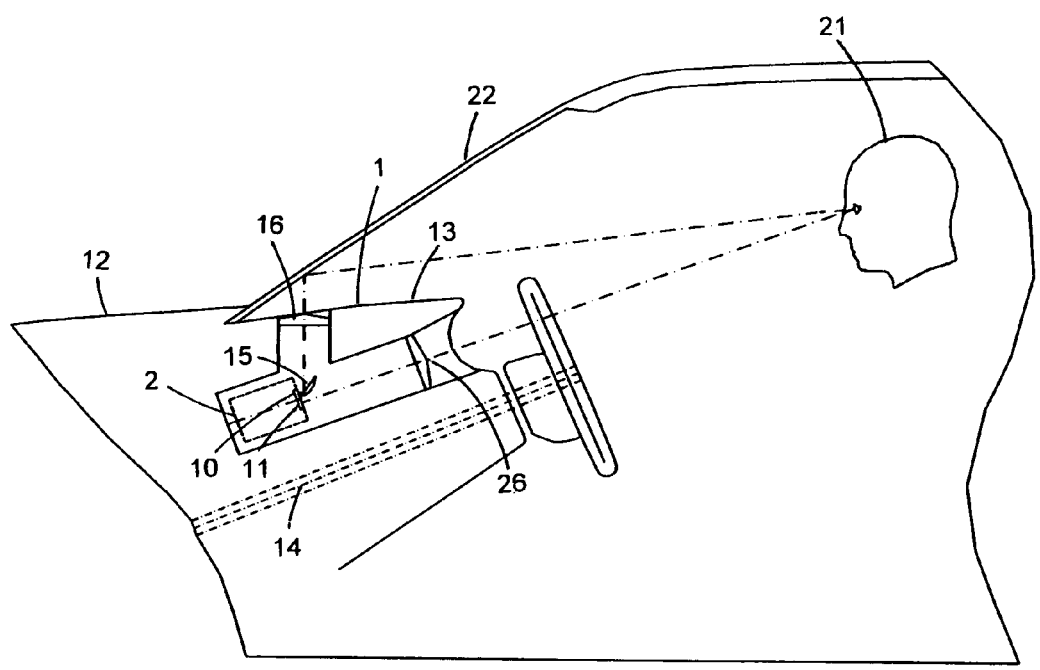

The display unit 1 scheme is indicated at FIG. 3 with its lower canal carried out as collimating optical system containing the objective 26 focal plane of which is superposed with lower segment 11 of image creator 2 optical integrator 9. At the same time the lower canal similarly to the upper canal provides the collimation (projection to optical infinity) for intermediate image 11 of informative picture which is directly viewed by the driver via objective 26. Such scheme of display system provides the possibility for the driver to view "out-the-window" scene and informative pictures at upper and lower canals without re-accommodation and re-adaptation of vision. In addition since the light beams from outer source can get the intermediate screen only via outlet objective and within objective angular field of view the ambient light effect is minimized for quality of image viewed by the driver at lower canal.

The scheme of display unit image creator based on two LCD matrixes is shown at FIG. 4. The image creator consists of two visualizers which are left 27 and right 28 (see FIG. 4A). Each visualizer is equipped with projective objective 29 and initial image creating means containing LCD matrix 30 of reflective type and the illuminator. The SXGA-R3-XD Micro display of Forth Dimension Display with 1280×1024 pixel resolution and screen working area h×g=17.43×13.95 mm could be utilized as LCD matrixes. The micro displays' screens 31 have to be installed with their long side—h being located vertically.

Represented at screens 31 the initial images is projected by objectives 29 onto the optical integrator 9 in the form of integrated intermediate image so as to superpose the vertical margins of left 32 and right 33 vusualizers' images with minimum overlap (1-2 pixels). Optical integrator 9 could be realized for instance by means of thin laysan film 34 fixed on rigid frame with its inside dimensions corresponding with intermediate image: vertical H and horizontal G dimensions. At the same time the distance between the axes of visualizers is 0.5 G.

At view N (see FIG. 4B) two areas of optical integrator are shown with upper area 10 of lesser square defining the intermediate image segment which is intended to be displayed at upper informational canal of display unit and the lower area 11 which is intended for the intermediate image segment to be displayed at lower informational canal of display unit.

In each visualizer the illuminator contains polarized light divider 36, polarizer 37, condenser 38 with Frenel lens and light source 39 consisting of tricolor LED of high brightness or three monochrome LED (blue, red and green).

The illuminator performance is illustrated by view F (see FIG. 4C). LED 39 is emitting no polarized light that could be characterized as a result of two components (p-polarized light and s-polarized light) addition. The polarizer 37 and polarized light divider 36 are orientated in such way that only s-polarized light is transmitted by polarizer and p-polarized light is transmitted and s-polarized light is reflected by light divider. Thus only s-polarized light gets the screen 31 of micro display 30. The reflected light becomes p-polarized by effect of liquid-crystal layer deposited on the screen and being freely transmitted by divider 36 enters the projective objective 29. The intensity of reflected p-polarized light at each micro display's pixel is dependent of the amount of control by means of which the representation of initial image is provided on the micro display screen.

Figure 5A:
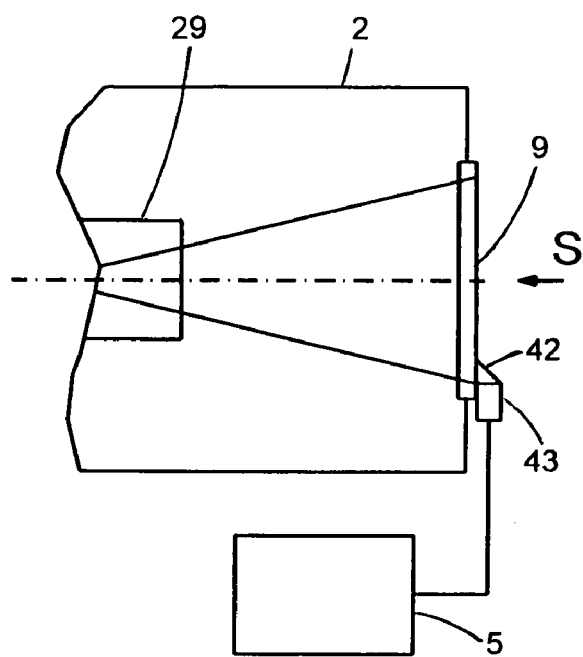
Figure 5B:
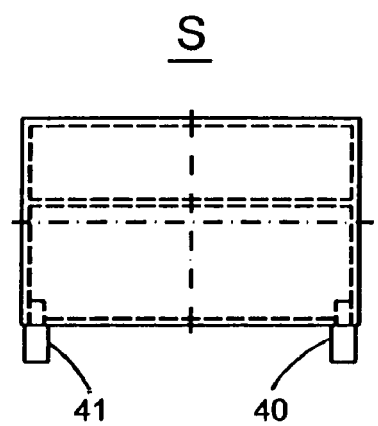
Figure 6:
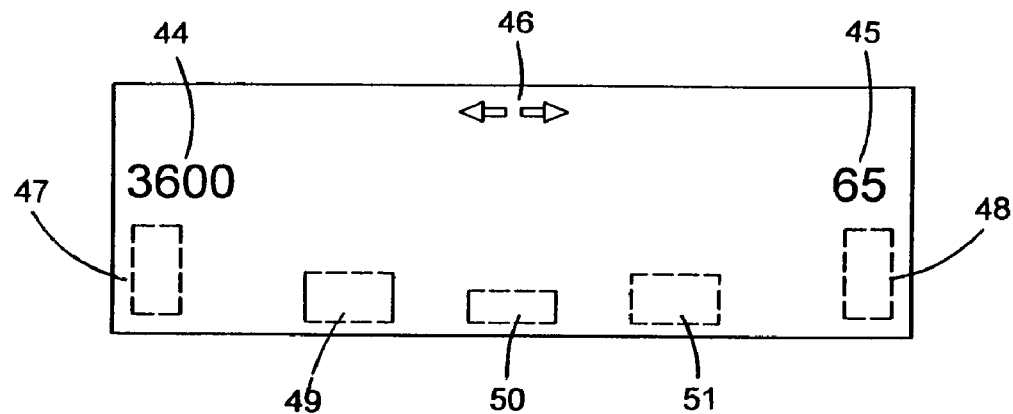
Figure 7:
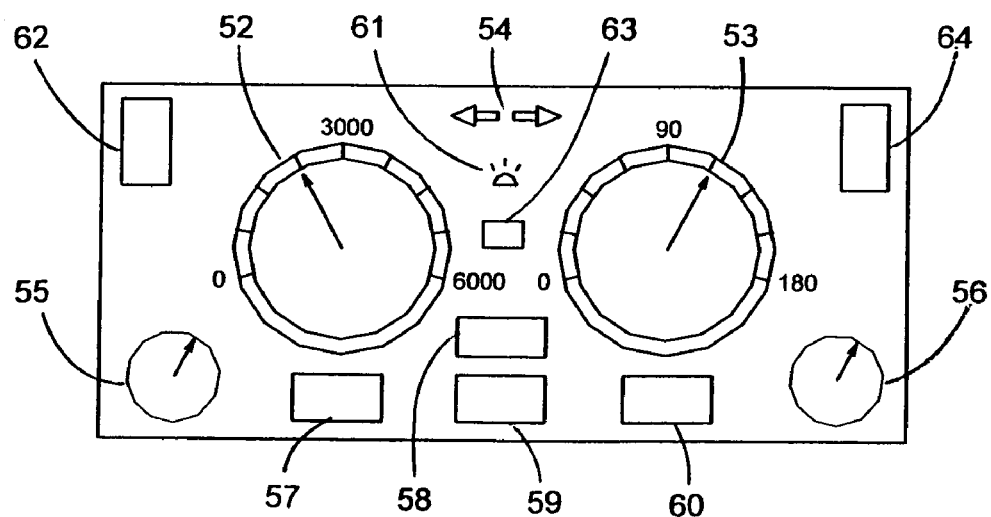
Figure 8:
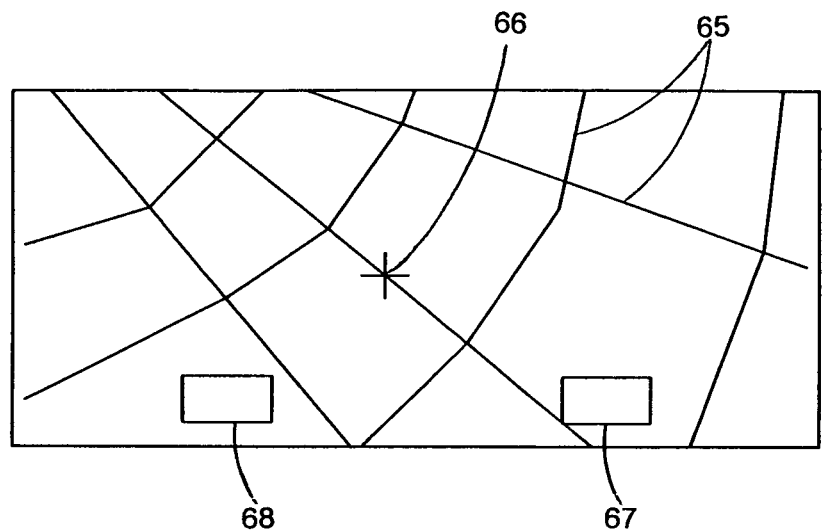
Figure 9:
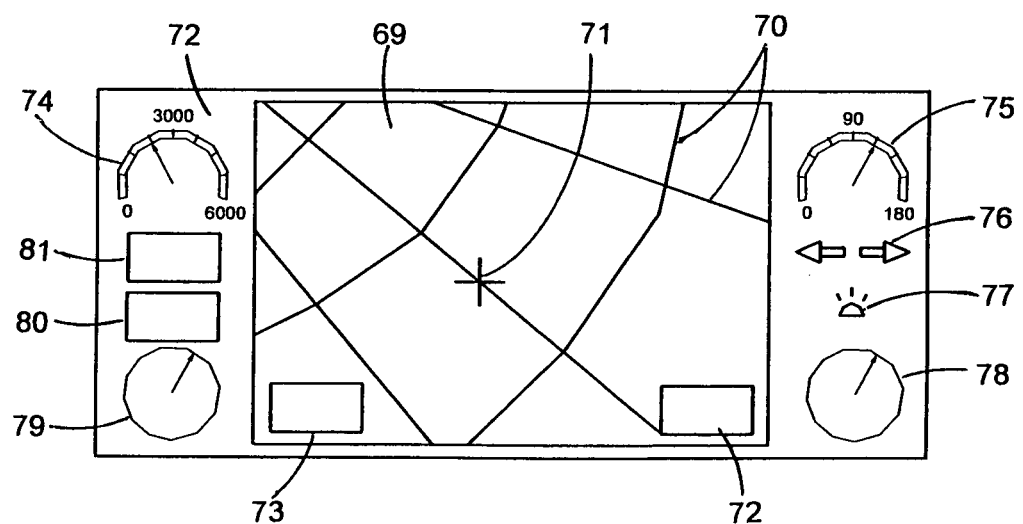
Figure 10:
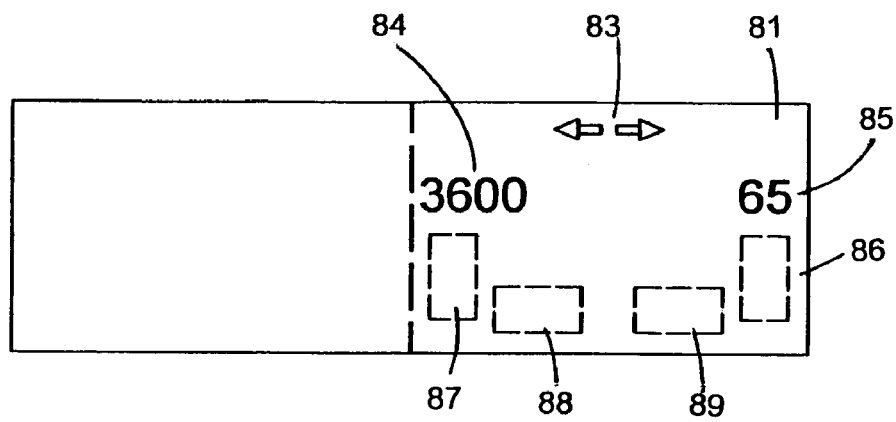
Figure 11:
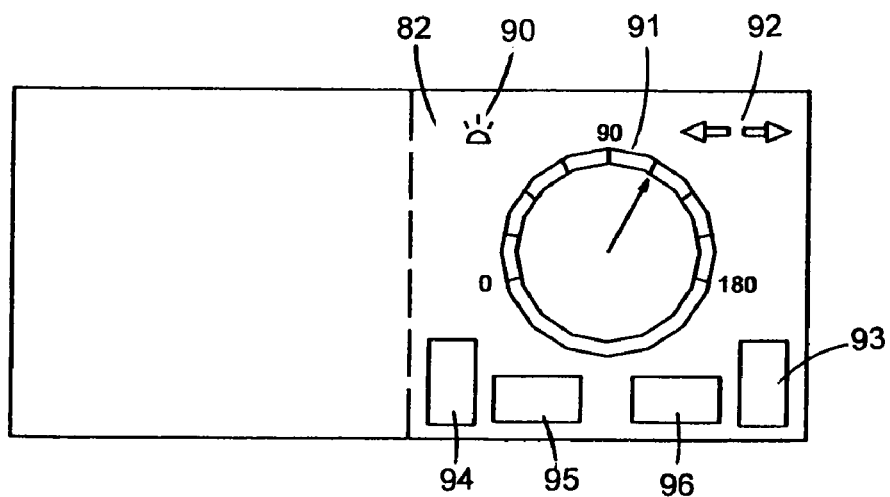

The operating diagram of control device for display unit image creator monitoring is indicated at FIG. 5. The control device 5 contains two photosensitive transducers 40 and 41 located at the peripheral segments of optical integrator 9 of intermediate image creator 2 as indicated at view S (see FIG. 5A). Each photosensitive transducer is equipped with right-angle prism 42 and photodiode 43 with prism input side locating closely to the plane of optical integrator (transparent screen) 9 and the photodiode input area locating closely to prism output side.

While operating under standard mode the left visualizer is continuously representing special constant brightness mark at the zone of sensor 40 prism location and presence of the mark is registered by corresponding signal of photosensitive transducer photodiode. Similarly the right visualizer is continuously representing at the zone of photosensitive transducer 41 prism location the special mark of constant brightness which is also registered by the corresponding signal of photosensitive transducer 41 photodiode.

If the representation of image half segment on optical integrator 9 by one of visualizers under control is interrupted for some reasons there is no signal at the corresponding photosensitive transducer. In this case the corresponding signal is generated by device 5 and specific program is activated by display system computer for transition to standby mode under which the image is provided with minimum content required for safe drive continuation by use of operable visualizer at appropriate half segments of upper and lower canals' information fields.

The information fields types are indicated at FIGS. 6-11 for Display system upper and lower canals under following operating modes:

image display mode (FIG. 6) for certain parameters of automobile drive and warning and other mnemonic signals to be represented at upper canal. For example there could be digital tachometer 44 and speed 45, turn signaling lights 46, and feasible readings of thermometer probe 47, fuel quantity indicator 48, storage battery charge 49, seat belts 50 position, opened door warning signal 51. In addition more priority messages could be displayed such as alert warning of obstacles or man on the road, emergency braking necessity, road icing, etc.;

display mode for lower canal image (FIG. 7) of scaled pointer-type devices and various symbols (for example, tachometer 52, speed 53, turn signaling lights 54, thermometer probe 55, fuel quantity indicator 56, storage battery 57, seat belts 58, speedometer 59, air bags 60, upper beam 61, opened door 62, lever brake 63, emergency messages indicator 64;

display mode for lower canal image (FIG. 8) of GPS navigation roadmap (for example, city map 65 with avenues and streets included, car location 66, reference data 67-68);

display mode for lower canal's combined image (FIG. 9) of roadmap and certain devices providing the representation of parameters required for safe drive (for example, city map 69, avenues and streets 70, car location 71, reference data 72-73, tachometer 74, speed 75, turn signaling lights 76, upper beam 77, fuel quantity indicator 78, thermometer probe 79, seat belts 80, speedometer 81);

stand-by display mode for upper and lower canals' images with minimum parameters required for safe drive in case one of visualizers is disabled.

For example, there could be parameters' images represented at information fields' half segments of upper 81 (see FIG. 10) and lower 82 (see FIG. 11) canals such as turn signaling lights 83, digital tachometer 84 and speed 85 and the readings are linked for fuel quantity indicator 86, thermometer probe 87, seat belts position 88, opened door warning signal 89, upper beam 90, speed scale 91, turn signaling lights 92, fuel quantity indicator 93, thermometer probe 94, seat belts position 95, opened door signal 96. In addition the emergency messages such as alert warning of approachment with obstacle or man on the road, emergency braking necessity, road icing, etc. could be represented at the windows 88, 89,95 and 96.

The considered here informational content for Display system canals is only one of feasible variants. Since the proposed optoelectronic display system contains computer it is possible to provide any types of informational content by making changes in software and thus meet the progress challenge and customers' demands.

ADVANTAGES OF THE INVENTION

The proposed and described above Display system for automobile and other vehicles application containing two canals for visual data representation both at instrument panel and at the windscreen provides all standard parameters required for safe drive.

As opposed to examined analogues, that are intended for the same problem to be solved such movable components as mirrors and light dividers and electromechanical drives are not required for the Display system proposed.

Generated at Display system by use of optoelectronic method the virtual image of instrument panel with pointer-type devices meets the requirements of up-to-date design in full. As opposed to mechanical instruments the proposed method for displayed devices image forming by means of software provides two significant advantages for proposed Display system:

unlimited resource for displayed devices' surface appearance improvement in accordance with requirements of human engineering and ergonomics;

resource for different variants of devices' surface appearance creating for application at different vehicles by means of software—based method. Due to both advantages it is possible to get adaptable display system in order to meet novel requirements for its' resource and to ensure modernization of vehicles equipped with proposed Display system in service.

The proposed engineering solutions ensure high operational performance such as:

high image quality due to high resolution of image creator, high brightness and contrast of images at both canals.

The proposed projection or collimation based schemes of lower canal operation makes it possible to select the appropriate Display system variant for certain type vehicle application.

The proposed engineering solutions applied for Display system provide continuity of information representation on the instrument panel required for safe automobile (or other vehicle) drive under extreme service conditions with one of image creator visualizer's failure as opposed to Display system analogues known.

We claim:

1. A display system comprising:
a computer connected with sensors in order to display signals,
a display unit installed in a panel equipped with upper and lower canals,
wherein a lower canal represents a first virtual image,
wherein an upper canal represents a second virtual image on the windscreen projected to optical infinity,
wherein the display unit is carried out with a unified optoelectronic image creator simultaneously generating different visual informative pictures and content display as the first virtual image and the second virtual image, respectively,
wherein the image creator is carried out with each of a first visualizer for the upper canal to display the first virtual image and second visualizer for the lower canal to display the second virtual image, wherein the image creator is further carried out with a projective object, an illuminator which consists of a tricolor LED or three monochrome LEDs which are red, green, and blue, and an optical integrator,
  wherein each of the first visualizer and second visualizer is based on LCD matrixes for the lower canal and upper canal;
  wherein the first visualizer and the second visualizer have the same width, but the first visualizer has a smaller height than the second visualizer,
  wherein the first visualizer and the second visualizer are side by side, wherein each image creator is carried out with a projective object,
  wherein the optical integrator is formed of a thin laysan film fixed on a rigid frame, and comprises:
    two photosensitive transducers located at the peripheral segments of the optical integrator, and each photosensitive transducer is equipped with a right-angle prism and a photodiode with a prism input side close to a plane of the optical integrator while a photodiode input area is close to the prism output side,
    wherein the optical integrator forms an intermediate image from the first and second visualizer with minimum overlap, and in a standard mode the first visualizer and the second visualizer are continuously displaying a constant brightness mark which is registered by each of the photosensitive transducer photodiodes, and in the case that one of the first visualizer or the second visualizer is out-of-service and the corresponding luminous mark is no longer displayed on the intermediate image, the corresponding photosensitive transducer is activated and icons required for safe driving are displayed at the visualizer still displaying the constant brightness mark,
  wherein each illuminator comprises:
    a polarized a light divider, a polarizer, a condenser, a Frenel lens, and a light source,
    whereas the polarizer and polarized light divider are oriented in such a way that only a first type of polarized light is transmitted by the polarizer and a second type of polarized light, different from the first type of polarized light, is reflected by the light divider such that only the first type of polarized light is transmitted to the upper canal to display the first virtual image from the first visualizer while the second type of polarized light is transmitted by the light divider to the lower canal to display the second virtual image from the second visualizer, and
    wherein the device provides control of each of the first visualizer and second visualizer.

2. The display unit as in claim 1 wherein one of the first visualizer and the second visualizer represents first segments and the other of the first visualizer and the second visualizer represents second segments of images which are displayed at each of the upper canal and the lower canal and an optical superposition of magnified intermediate images with minimum overlap is carried out at the optical integrator of the intermediate images.

3. The display unit as in claim 2 wherein in order to represent the first virtual image at the upper canal the corresponding intermediate image which is displayed in a collimated form and superimposed on the focal plan of the upper canal.

* * * * *